(12) United States Patent
Radev et al.

(10) Patent No.: US 10,904,330 B2
(45) Date of Patent: Jan. 26, 2021

(54) SYSTEMS, METHODS AND APPARATUS TO MANAGE SERVICES IN DISTRIBUTED SYSTEMS

(71) Applicant: VMware, Inc., Palo Alto, CA (US)

(72) Inventors: Ivaylo Radoslavov Radev, Sofia (BG); Yasen Fotev Kalchev, Sofia (BG); Tomo Vladimirov Simeonov, Sofia (BG); Ivailo Vladimirov Loboshki, Sofia (BG); Vladislav Milenov Atanasov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 66 days.

(21) Appl. No.: 16/031,514

(22) Filed: Jul. 10, 2018

(65) Prior Publication Data
US 2020/0021648 A1    Jan. 16, 2020

(51) Int. Cl.
*H04L 29/08* (2006.01)
*G06F 9/455* (2018.01)

(52) U.S. Cl.
CPC ...... *H04L 67/1095* (2013.01); *G06F 9/45558* (2013.01); *H04L 67/28* (2013.01); *G06F 2009/45583* (2013.01); *G06F 2009/45595* (2013.01)

(58) Field of Classification Search
CPC ......... G06F 9/45558; G06F 2009/4557; G06F 2009/45595; G06F 9/4881; G06F 9/5077; H04L 67/1002; H04L 61/1511; H04L 67/1008; H04L 12/4641; H04L 29/08153; H04L 41/0806; H04L 47/72; H04L 47/781; H04L 49/70; H04L 61/1541; H04L 61/2076; H04L 61/2084
See application file for complete search history.

(56) References Cited

U.S. PATENT DOCUMENTS

| | | | | |
|---|---|---|---|---|
| 7,962,545 | B2 * | 6/2011 | Knauerhase | G06F 9/465 709/203 |
| 9,069,730 | B2 * | 6/2015 | Talwar | G06F 11/004 |
| 10,552,208 | B2 * | 2/2020 | Oshins | G06F 9/4856 |
| 10,601,837 | B1 * | 3/2020 | Sharma | G06F 21/53 |

(Continued)

OTHER PUBLICATIONS

Richardson, "Pattern: Health Check API," Microservice Architecture, supported by Kong [https://github.com/Mashape/kong], retrieved on May 22, 2018, 2 pages.

(Continued)

*Primary Examiner* — Ninos Donabed
(74) *Attorney, Agent, or Firm* — Hanley, Flight & Zimmerman, LLC

(57) ABSTRACT

Methods, apparatus, systems and articles of manufacture manage services in distributed systems are disclosed. An example distributed system includes a first virtual machine including a first storage device to store a first service registry for a plurality of virtual machines, and a second virtual machine, of the plurality of virtual machines, including a second storage device to store a second service registry for the second virtual machine, and a proxy service registrar having an interface to selectively provide a first service from the first service registry or the second service registry responsive to a query of the second virtual machine for the first service.

15 Claims, 6 Drawing Sheets

(56) References Cited

U.S. PATENT DOCUMENTS

| | | | |
|---|---|---|---|
| 2004/0128670 A1* | 7/2004 | Robinson | H04L 29/12113 718/1 |
| 2005/0268078 A1* | 12/2005 | Zimmer | G06F 9/5094 713/1 |
| 2010/0153945 A1* | 6/2010 | Bansal | G06F 9/4881 718/1 |
| 2012/0030671 A1* | 2/2012 | Matsubara | H04L 67/34 718/1 |
| 2013/0013732 A1* | 1/2013 | MacHida | G06F 9/45558 709/217 |
| 2013/0227089 A1* | 8/2013 | McLeod | G06F 9/45558 709/220 |
| 2013/0238802 A1* | 9/2013 | Sarikaya | H04L 29/08153 709/226 |
| 2014/0040884 A1* | 2/2014 | Donahue | G06F 8/63 718/1 |
| 2014/0082131 A1* | 3/2014 | Jagtap | G06F 9/5072 709/217 |
| 2014/0189357 A1* | 7/2014 | Park | H04L 63/061 713/171 |
| 2014/0250501 A1* | 9/2014 | Berard | G06F 21/6218 726/4 |
| 2015/0012918 A1* | 1/2015 | Derrin | G06F 9/45558 718/1 |
| 2015/0029542 A1* | 1/2015 | Morita | G06F 3/1236 358/1.15 |

OTHER PUBLICATIONS

Richardson, "Pattern: Service registry," Microservice Architecture, supported by Kong [https://github.com/Mashape/kong], retrieved on May 22, 2018, 3 pages.

VMware, "VMware Infrastructure Architecture Overview," VMware Whitepaper, 2006, 14 pages.

\* cited by examiner

US 10,904,330 B2

SYSTEMS, METHODS AND APPARATUS TO MANAGE SERVICES IN DISTRIBUTED SYSTEMS

FIELD OF THE DISCLOSURE

This disclosure relates generally to distributed systems and, more particularly, to managing services in distributed systems.

BACKGROUND

Distributed systems include a plurality of nodes (e.g., computing nodes) executing at the same and/or separate times. The nodes of the distributed system can be implemented as virtual machines executing on the same or different processor platforms. The nodes can execute the same and/or different services and/or versions of services.

Figure 1:
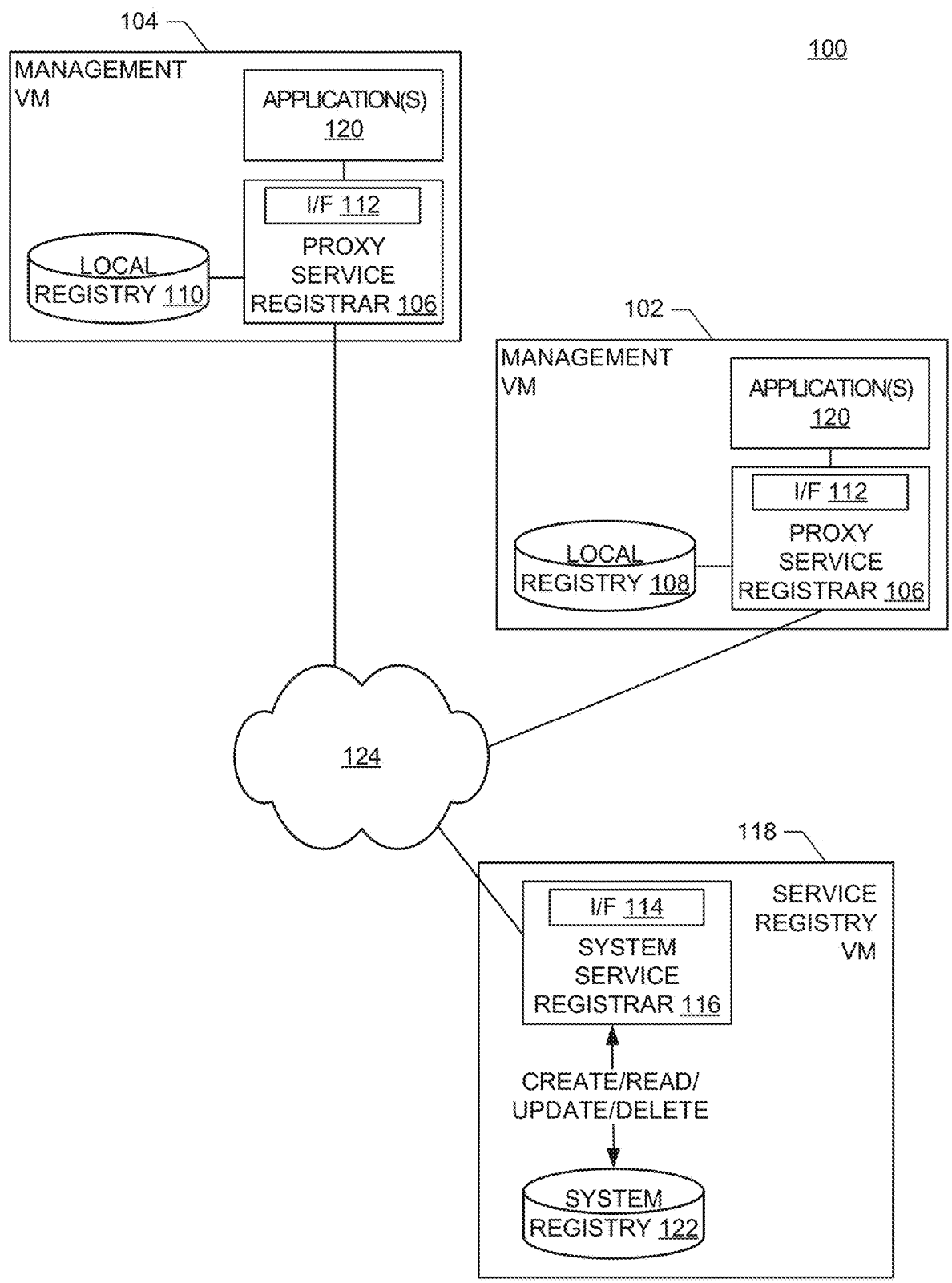
FIG. 1 illustrates an example distributed system having a plurality of nodes constructed in accordance with teachings of this disclosure and shown in an example environment of use.

As beneficial in explaining teachings of this disclosure, the same reference numbers will be used in the drawing(s) and accompanying written description to refer to the same or like parts. Connecting lines or connectors shown in the various figures presented are intended to represent example functional relationships and/or physical or logical couplings between the various elements.

DETAILED DESCRIPTION

The updating (e.g., upgrading, patching, installing, downgrading, etc.) of a modern multiservice distributed system can be complex. During an update operation, new services and/or versions of services may be registered (e.g., added, installed, changed, etc.) and/or existing services and/or versions of services might be deprecated (e.g., deregistered, removed, deinstalled, downgrading, etc.). Conventionally, service instances registered and/or deprecated during the updating of an application state are pushed to a service registry. At the end of the updating, the service registry thus contains the recent changes. While references are made herein to services, teachings of this disclosure apply to any software, software data, etc. stored in one or more registry. Further, more than one service/software/etc. can be installed on a virtual machine (VM).

An advantage of virtualization technologies is that a snapshot of a VM can be taken to reduce (e.g., prevent, minimize, etc.) data loss and/or facilitate fast recovery when an updated VM fails to start and/or does not operate as intended. When an application is distributed among multiple VMs (e.g., one for service registry, one or more for management services, one for computing, etc.), the updating of one or more of the VMs in which services are running (e.g., a management VM) may fail and/or have post-update issues. To resolve the failures and/or issues, the customer can use a snapshot to restore the VM(s) to a previous state that operated as intended. However, the reverted VM state may not match the state of the services stored in the service registry because during the update, services data (also referred to as data about services) such as services including different versions of services, information regarding services, locations of services, data associated with services, etc.) may have been changed, thereby modifying the service registry. This is expected, because the customer reverted only the VM, but did not revert the state of the service registry, hence only a partial state is reverted. With prior systems, customers cannot revert the service registry because while the VM was updated the service registry data might have been updated by another VM, application, service, etc. Hence, reverting the service registry state could cause another VM to be out-of-sync and/or introduce data losses.

Methods, apparatus and articles of manufacture are disclosed herein that overcome at least these deficiencies and/or provide further advantages. Disclosed examples includes proxy service registrars that ensure that VMs having updateable services can boot and operate as intended after updating, even when the update and/or a new service causes a VM to initially fail to boot and/or fail to operate as intended. The disclosed proxy service registrars interject themselves between a VM and a system service registrar and, thus, enable a VM to be reverted to a prior state even when a system service registry has changed. The disclosed proxy service registrars improve the reliability and updating of services in a way that consistently results in VMs operating as intended.

Reference will now be made in detail to non-limiting examples, some of which are illustrated in the accompanying drawings.

Figure 2:
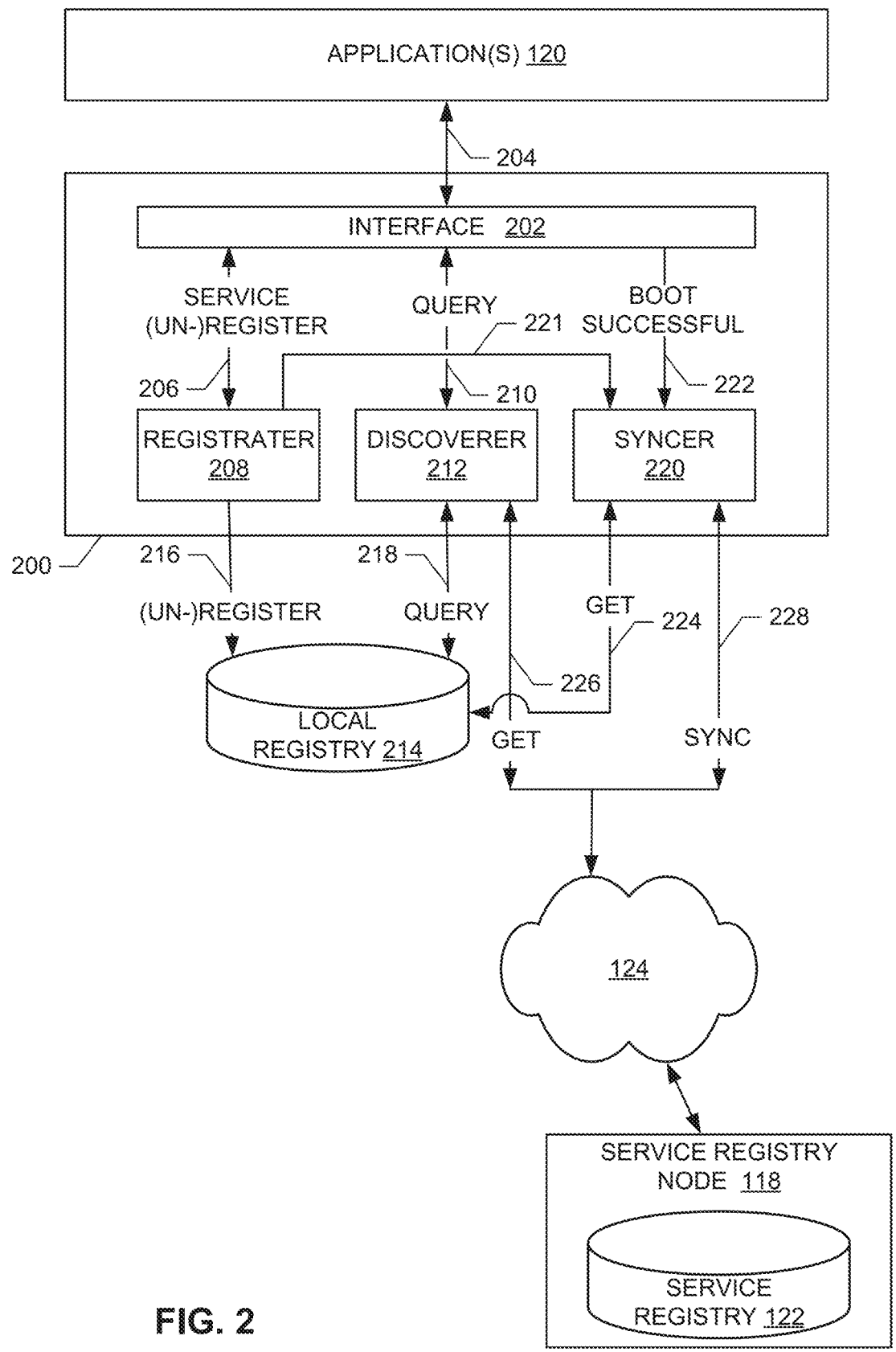
FIG. 2 is a block diagram illustrating an example implementation of the example proxy service registrars of FIG. 1.
Figure 3:
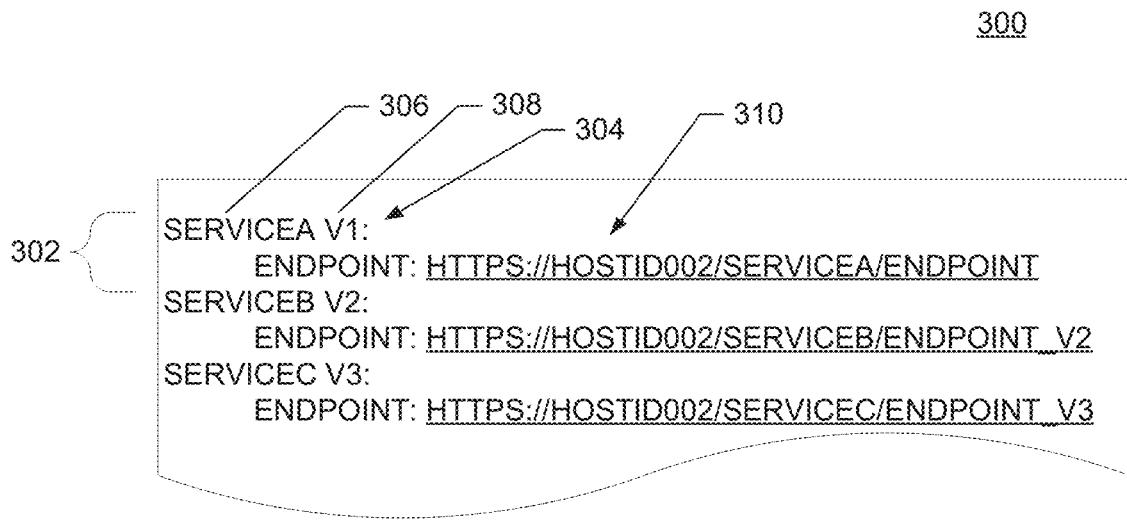
FIG. 3 is an example implementation of the example local service registries of FIG. 1 and/or FIG. 2.

FIG. 1 illustrates an example distributed system 100 having a plurality of VMs (e.g., management VMs, computing VMs, etc.), two of which are designated at reference numerals 102 and 104, constructed in accordance with teachings of this disclosure and shown in an example environment of use. To overcome at least the above problems and/or limitations, each of the example VMs 102 and 104 of FIG. 1 include an example proxy service registrar 106 in accordance with teachings of this disclosure. The example proxy service registrar 106 of the example VM 102 of FIG. 1 implements an example local service registry 108 for the VM 102, and the example proxy service registrar 106 of the example VM 104 of FIG. 1 implements an example local service registry 110 for the VM 104. Because the VMs 102 and 104 may be executing different services, the local service registries 108 and 110 may store different services data. FIG. 2 is a block diagram illustrating an example proxy service registry 200 in accordance with teachings of this disclosure that may be used to implement the example proxy service registrars 106 of FIG. 1. In the illustrated example of FIG. 1, each VM 102, 104 can be associated with its own proxy service registrar 106 and its own local service registry 108, 110. Additionally, and/or alternatively, a proxy service registrar 106 and a corresponding local service registry 108, 110 are associated with more than one VM 102, 104. For example, when a hierarchy of VMs 102, 104 is implemented and are updated in, for example, coordinated groups. FIG. 3 is an example data structure 300 that may be used to implement the local service registries 108, 110.

The example proxy service registrars 106 of FIG. 1 each implement an example interface 112 (e.g., an application programming interface (API)) similar to or the same as an example service registry interface 114 (e.g., an API) implemented by an example system service registrar 116 of an example service registry VM 118. Elements (e.g., modules, software, applications 120, services, etc.) of the VMs 102 and 104 need not be aware they are interacting with their respective proxy service registrar 106 rather than the system service registrar 116. In some examples, the elements of the VMs 102, 104 require no changes to integrate with their respective proxy service registrar 106. For example, elements of a VM 102, 104 interact with their respective local proxy service registrar 106, as a proxy of the system service registrar 116, rather than the system service registrar 116 itself to obtain services data.

The example system service registrar 116 of FIG. 1 manages a system service registry 122 of services data for a plurality of VMs of the example distributed system 100. Services data may be stored in the example system service registry 122 for any number of VMs using any number and/or type(s) of data structures such as an example data structure 400 shown in FIG. 4. The system service registry 122 may be implemented by any number and/or type(s) of non-transitory computer-readable storage devices and/or disks.

The example VMs 102, 104 and 118 of FIG. 1 are communicatively coupled via any number and/or type(s) of private and/or public communication mean(s) 124 including, but not limited to, a backplane of a multi-server computing cluster, inter-processor communication, connections within a data center, the Internet, a wide area network (WAN), a local area network (LAN), any other communication technology(-ies), and/or any combination(s) thereof.

The example VMs 102, 104 of FIG. 1 interact with their respective local proxy service registrar 106 for services data rather than with the system service registrar 116. The example proxy service registrars 106 of FIG. 1 are authoritative sources for local services data and provide a proxy for the system service registrar 116. Remote service registrations (e.g., a registration of a service available to other VMs 102, 104) are not managed by the local proxy service registrars 106. Instead, for remote service registrations, deprecations, information, etc., the proxy service registrar 106 interacts with the system service registrar 116 on behalf of the VM 102, 104. The local proxy service registrar 106 registers, deprecates, obtains information about, etc. local services from its local service registry 108, 110.

When updating a VM 102, 104 begins, its respective local proxy service registrar 106 puts the VM 102, 104 in a maintenance mode. While in the maintenance mode, the local proxy service registrar 106 does not modify (register, deprecate, etc.) services in the system service registry 122. Instead, the proxy service registrar 106 writes the modifications to its respective local service registry 108, 110. The use of maintenance mode is optional. For example, when it is not necessary, needed, desired, etc. to reduce, avoid, etc. pollution of the system service registry 122 with failed updates maintenance mode may not be used.

When the updating is successfully completed, the VM 102, 104 exits the maintenance mode, and its respective local proxy service registrar 106 synchronizes services data stored in the local service registry 108, 110 with the system service registry 122 via the system service registrar 116. In some examples, the system service registrar 116 does not need to know which, if any, updates were initially stored in the local service registries 108, 110. In some examples, further services data is written to the local service registry 108, 110 and the system service registry 122 at similar or the same times. Services data updates both the state of the local service registry 108, 110 and the state of the system service registry 122.

When, for example, a VM 102, 104 is powered on, (re)started, etc., a proxy service registrar 106 is (re)started, etc. service registrations are synchronized with the system service registry 122. During system startup, the system service registry 122 is the synchronization point for the local service registry 108, 110 in case there is an inconsistency (e.g., if a customer reverts either of a management VM snapshot or a Service Registry VM snapshot).

In the illustrated example of FIG. 1, service discovery requests from the application(s) 120 are handled locally by the proxy service registrar 106. If no result(s) are found in the local service registry 108, 110, the proxy service registrar 106 queries the system service registrar 116. If the application(s) 120 request multiple services, some of which are not found in the local service registry 108, 110 result(s) from a local search and result(s) from a query of the system service registrar 116 are combined before the result(s) are returned to the application(s) 120.

While an example manner of implementing a distributed system 100 is illustrated in FIG. 1, one or more of the elements, processes and/or devices illustrated in FIG. 1 may be combined, divided, re-arranged, omitted, eliminated and/or implemented in any other way. Further, the example VMs 102, 104, the example proxy service registrars 106, the example local service registries 108, 110, the example interfaces 112, 114, the example system service registrar 116, the example service registry VM 118, the application(s) 120, the system service registry 122 and/or, more generally, the example distributed system 100 of FIG. 1 may be implemented by hardware, software, firmware and/or any combination of hardware, software and/or firmware. Thus, for example, any of the example VMs 102, 104, the example proxy service registrars 106, the example local service registries 108, 110, the example interfaces 112, 114, the example system service registrar 116, the example service registry VM 118, the application(s) 120, the system service registry 122, and/or the example distributed system 100 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example VMs 102, 104, the example proxy service registrars 106, the example local service registries 108, 110, the example interfaces 112, 114, the example system service registrar 116, the example service registry VM 118, the application(s) 120, the system service registry 122, and/or the example distributed system 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example distributed system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2 is a block diagram illustrating an example proxy service registrar 200 that may be used to implement the example proxy service registrars 106 of FIG. 1. To interact with the example application(s) 120, the example proxy service registrar 200 of FIG. 2 includes an example interface 202. The example interface 202 of FIG. 2 is similar to or the same as the example service registry interface 112 of FIG. 1, so the interface 202 implements an interface that is the same as or similar to the interface 114 of the example system service registrar 118. The example interface 202 of FIG. 2 directs interactions 204 with the application(s) 120 to components of the proxy service registrar 200. Service registration and deregistration (e.g., a deprecation) interactions 206 are directed to an example registrater 208, queries for services data interactions 210 are directed to an example discoverer 212, etc. In the illustrated example, the application(s) 120 are not aware they are interacting with the proxy service registrar 200 rather than with the system service registrar 116 and require no changes to integrate with their respective proxy service registrar 106 rather than with the system service registrar 116 to obtain services data regardless whether they are stored in the system service registry 122 or in the local service registries 108, 110.

To register, deprecate, update, etc. services, the example proxy service registrar 200 of FIG. 2 includes the example registrater 208. The example registrater 208 of FIG. 2 carries out the services interactions 206 by updating a local service registry 214. The example registrater 208 updates the local service registry 214 by performing operations 216 including registering, deprecating, updating, etc. services according to the format of the local service registry 214. For example, by writing services data into a table of the local service registry 214. Services data may be stored in the local service registry 214 using any number and/or type(s) of data structures such as an example data structure 300 shown in FIG. 3. The local service registry 214 may be implemented by any number and/or type(s) of non-transitory computer-readable storage devices and/or disks.

To discover services data, the example proxy service registrar 200 of FIG. 2 includes the example discoverer 212. The example discoverer 212 of FIG. 2 carries out the query interactions 210 by querying 218 the local service registry 214 for services data. For example, by searching and reading services data from a table of the local service registry 214. If no result(s) are found in the local service registry 214, the discoverer 212 queries the system service registry 122. If multiple services are requested, some of which are not found in the local service registry 214, result(s) from a local search of the local service registry 214 and result(s) from a query of the system service registry 122 are combined before the result(s) are returned.

To synchronize services data with the system service registry 122, the example proxy service registrar 200 includes an example syncer 220. As the example registrator 208 carries out the (un-)register operations 216, the registrator 208 performs corresponding schedule operations 221 for the example syncer 220. If the proxy service registrar 200 is not in maintenance mode, the syncer 220 carries out the operations 216 as received. Otherwise, the operations 216 are queued until maintenance mode is ended. When a boot, (re)start, power on, system update, exit from maintenance mode, etc. successful indication 222 is received, the example syncer 220 of FIG. 2 applies changes made to the local service registry 214 as reflected in the schedule operations 221 since the last synchronization to the system service registry 122 and applies changes made to the system service registry 122 since the last synchronization to the local service registry 214. For example, the syncer 220 performs a get operation 224 to obtain service information from the local service registry 214, performs a get operation 226 to obtain service information from the system service registry 122, and performs a synchronize operation 228 to synchronize the services data obtained from the local service registry 214 and the system service registry 122. In some examples, synchronization is performed after the VM associated with the proxy service registrar 200 has completed an update and is operating as intended. In some examples, synchronization includes applying changes (e.g., identifying changes, copying/storing/updating/etc. data, copying/storing/updating/etc. information, etc. associated with the changes, etc.). After the synchronization, a portion of the system service registry 122 is the same as a local registry (e.g., the local service registry 214). In some instances, changes may be made by other VMs while the system service registry 122 and the local registry are being synchronized. In some examples, the local registry 214 is a structured query language (SQL) database, the registrater 208, the discoverer 212 and the syncer 220 implement SQL interfaces to update the SQL-based local registry 212. However, other database structures and interfaces could be used to implement the local registry 214.

In general, the example syncer 220 of FIG. 2 resolves inconsistencies between a local registry 108, 110, 214 and a system registry 122. Such inconsistencies arise, for example, when a management VM 102, 104 is updated, a management node/VM snapshot is reverted, a system registry node/VM snapshot is reverted, a service (un-)register operation 216 where service stored in local registry 108, 110, 214 but, for example, due to networking error not stored in service registry 122, etc.

When a snapshot of the service registry VM 118 is reverted, records in the system registry 122 may become out of sync. The first (re)synchronization may come when the example syncer 220 on a management VM 102, 104 decides to re-sync (e.g., service update, restart, boot, update successful, exit maintenance mode, etc.), which may unintendedly run for an indefinitely long period of time. To resolve such circumstances, notification mechanisms may be implemented. For example, when there has been a persistent connection between a syncer 220 and the system service registrar 116, the syncer 220 resynchronizes with the system service registrar 116 when the connection is reestablished after it has dropped. If there is no persist connection between a syncer 220 and the system service registrar 116, then the syncer 220 periodically and/or aperiodically polls the system service registrar 116 (e.g., it's watermark) to determine whether the syncer 220 and the system service registrar 116 are out of sync. If they are out of sync, the syncer 220 resynchronizes with the system service registrar 116.

While an example manner of implementing the proxy service registrar 106 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 202, the example registrater 208, the example discoverer 212, the example local system registry 214, the example syncer 220 and/or, more generally, the example proxy service registrar 200 of FIG. 2 may be implemented by hardware, software, firmware and/or any combination of hardware, software and/or firmware. Thus, for example, any of the interface 202, the example registrater 208, the example discoverer 212, the example local system registry 214, the example syncer 220 and/or, more generally, the example proxy service registrar 200 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example interface 202, the example registrater 208, the example discoverer 212, the example local system registry 214, the example syncer 220 and/or the example proxy service registrar 200 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example proxy service registrar 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 3 is an example format of an example entry 300 of the example local service registries 108, 110 and 214 of FIGS. 1 and 2. In the illustrated example of FIG. 3, a plurality of entries, one of which is designated at reference numeral 302, are included. The example entry 302 has an identifier 304 that specifies a service 306 of "SERVICEA" and a version 308 of "V1" 308. The example entry 302 also includes a location field 310 that identifies where the file for the service 306 with version 308 is located. In the example of FIG. 3, the location field 310 contains a uniform resource locator (URL) address. Services may be associated with other properties such as, but not limited to, owner, component or other key-value data, etc. Endpoints may, in some examples, have associated type(s), protocol(s), etc.

Figure 4:
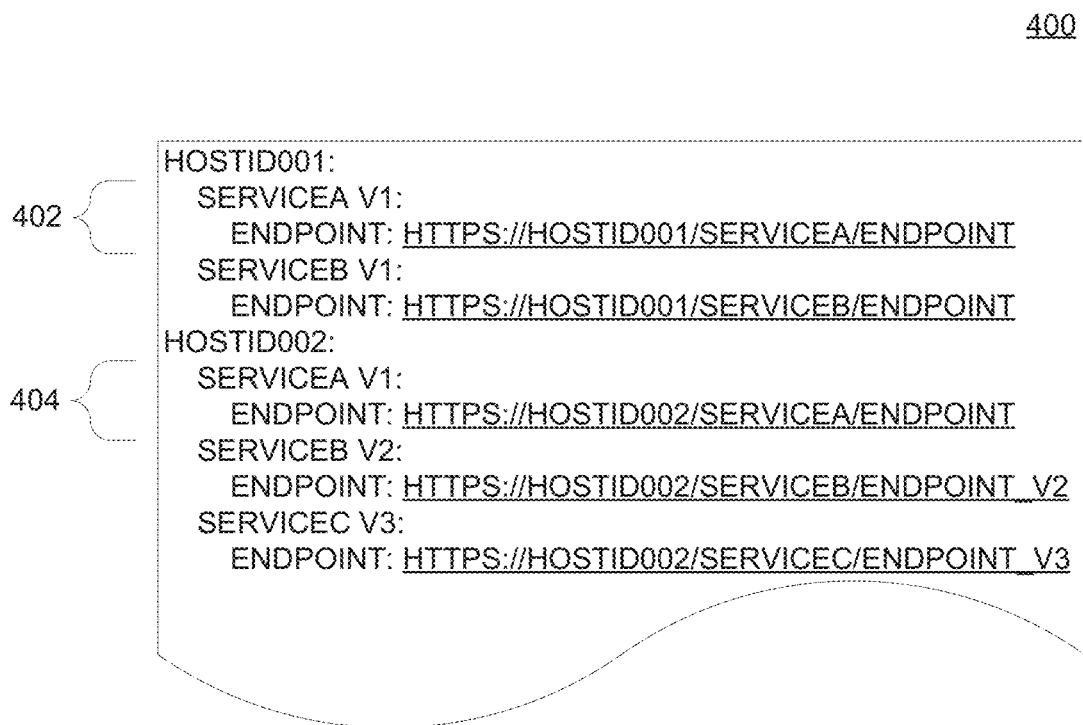
FIG. 4 is an example implementation of the example system service registry of FIG. 1.

FIG. 4 is an example format of an example entry 400 of the example system service registry of FIG. 1 and/or FIG. 2. In the illustrated example of FIG. 4, a plurality of entries, two of which are designated at reference numerals 402 and 404, are included. In the illustrated example of FIG. 4, the example entries 402 and 404 are structured similar to or the same as the example entry 302 discussed above in connection with FIG. 3. As shown in the example of FIG. 4, service A version v1 is installed on two different machines/VMs HOSTID001 and HOSTID002; different versions v1 and v2 of Service B are stored on HOSTID001 and HOSTID002; and Service C is only installed on HOSTID002.

Figure 5:
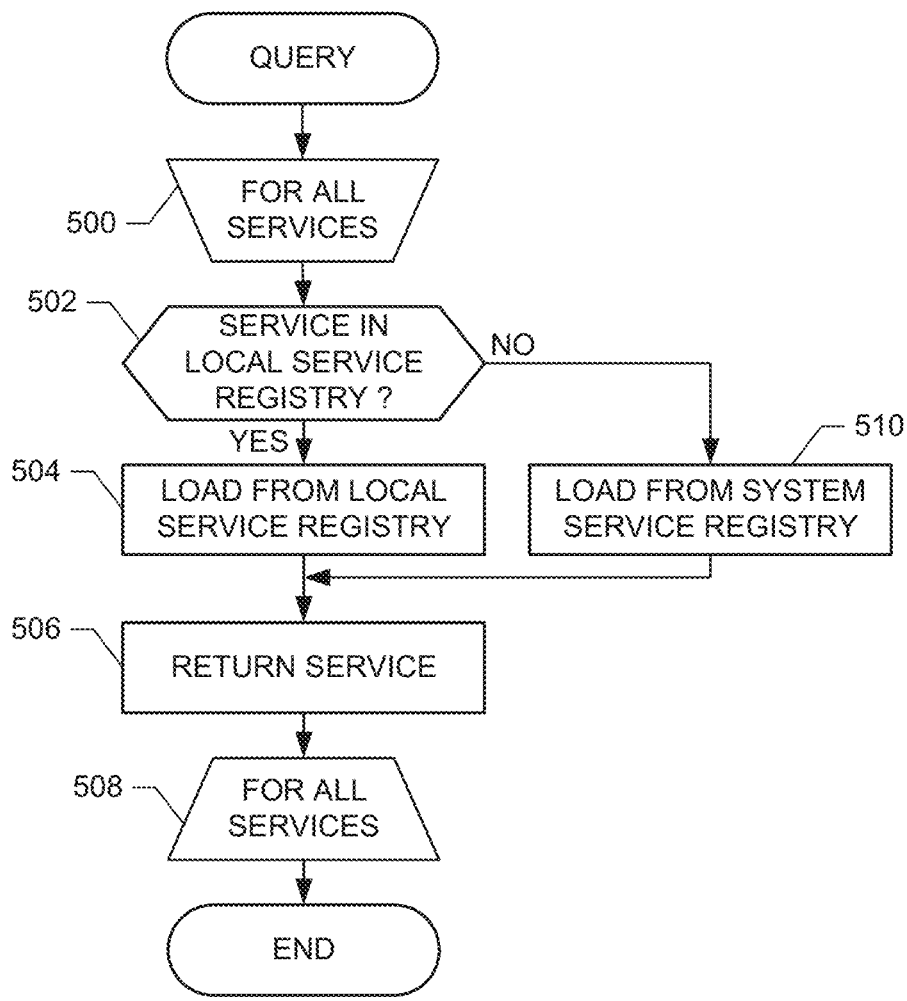
FIGS. 5 and 6 are flowcharts representative of example hardware logic or machine-readable instructions for implementing the example proxy service registrars of FIGS. 1 and 2 to query and update services, respectively, in distributed systems.
Figure 6:
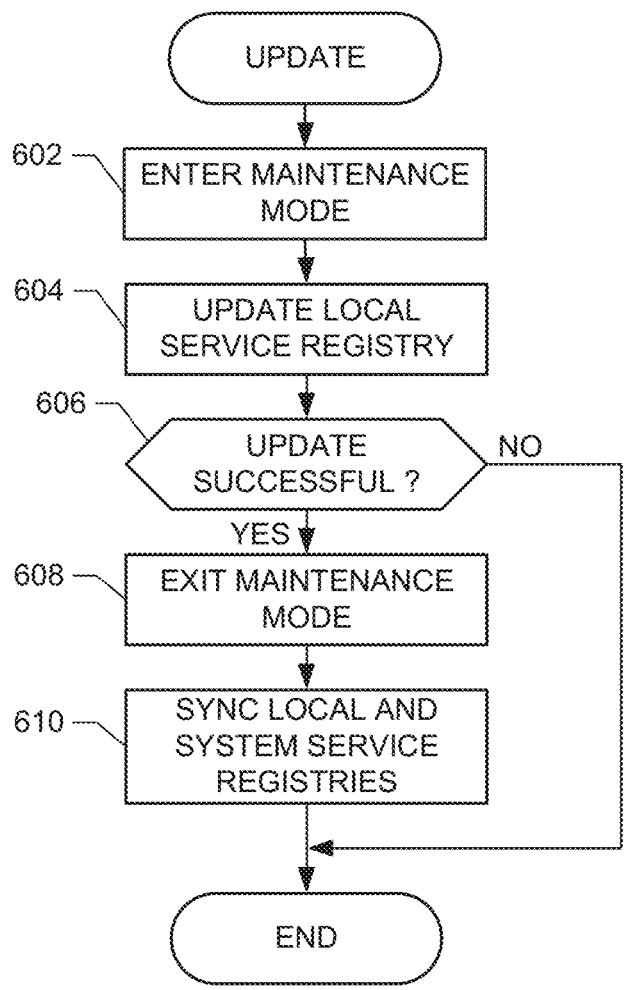

Flowcharts representative of example hardware logic or machine-readable instructions for implementing the proxy service registrars 106, 200 and/or, more generally, the example VMs 102, 104 are shown in FIGS. 5 and 6. The machine-readable instructions may be a program or portion of a program for execution by a processor such as the processor 710 shown in the example processor platform 700 discussed below in connection with FIG. 7. The program may be embodied in software stored on a non-transitory computer-readable storage medium such as a compact disc read-only memory (CD-ROM), a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowcharts illustrated in FIGS. 5 and 6, many other methods of implementing the example proxy service registrars 106, 200 and/or, more generally, the example VMs 102, 104 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5 and 6 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example program of FIG. 5 begins at block 500. For each service to be loaded (block 500), the VM 102, 104 determines whether the service to be loaded is located in a local service registry 108, 110, 214 (block 502). For example, as shown in FIG. 2, an application 120 sends a query 210 to a discoverer 212. If the service is located in the local service registry 108, 110, 214 by the discoverer 212 using a query 218 (block 502), the discoverer 212 obtains the service (e.g., obtains a pointer to or an identifier for a file containing the service, receives a file containing the service, etc.) from the local service registry 108, 110, 214 (block 504). The discoverer 212 returns (e.g., returns a pointer to or an identifier for a file containing the service, returns a file containing the service, etc.) the service to the application 120 (block 506). If more services are to be loaded (block 508), control returns to block 502 to locate the next service. Otherwise, control exits from the example program of FIG. 5.

Returning to block 502, if the service is not located in the local service registry 108, 110, 214 by the discoverer 212 (block 502), the discoverer 212 obtains the service from the system service registry 122 using the query 226 (block 510). The discoverer 212 returns the service to the application 120 (block 506). If more services are to be loaded (block 508), control returns to block 502 to locate the next service. Otherwise, control exits from the example program of FIG. 5.

The example program of FIG. 6 begins at block 604, where a VM 102, 104 is placed in maintenance mode (block 602) and the VM 102, 104 is updated (block 604). For example, as shown in FIG. 2, an application 120 provides services updates 206 to a registrater 208 that writes 216 the updates 206 in a local service registry 214. When updates are completed successfully (block 606), the VM 102, 104 exits maintenance mode (block 608) and the example syncer 220 synchronizes the local service registry 214 with a system service registry 122 (block 610), and control exits from the example program of FIG. 6. A successful update can be determined by, for example, a successful (re-) boot, (re-) start, etc. In general, a successful update is one where an updated VM/machine is operating as intended (e.g., without any errors, without any critical errors, as an intended by one or more programmers who developed an application, etc.) after the update is completed.

In the illustrated example of FIG. 6, when the updates are not completed successfully (block 606), the VM 102, 104 remains in maintenance mode to allow, e.g., human (e.g., manual) intervention, automatic (e.g., an automation tools/framework) intervention, etc. to resolve the unsuccessful updates.

In some examples, a snapshot of the VM 102, 104 may have been captured prior to execution of the program of FIG. 6. Thus, after the example program of FIG. 6, if the VM 102, 104 was not updated successfully, the snapshot of the VM 102, 104 can be reverted by, for example, human (e.g., manual) intervention, automatic (e.g., an automation tools/framework) intervention, etc. The syncer 220 can then be executed (e.g., on (re-)start, boot, etc.) to ensure the local service registry 214 is synchronized with the system registry 122, including any changes to the system registry 122 made after the snapshot was captured.

Figure 7:
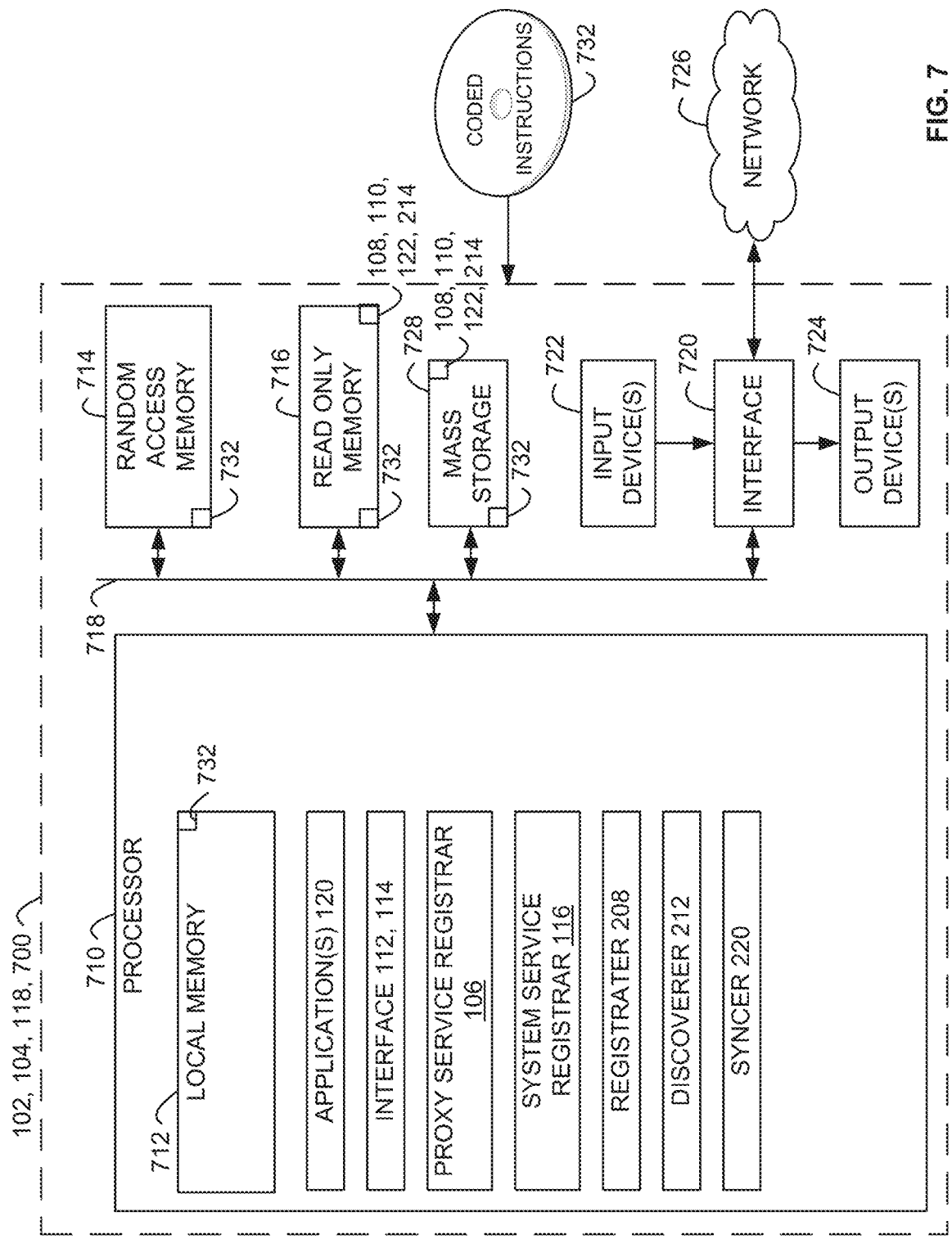
FIG. 7 illustrates an example processor platform structured to execute the example machine-readable instructions of FIGS. 5 and 6 to implement the example proxy service registrars of FIGS. 1 and/or 2.

FIG. 7 is a block diagram of an example processor platform 700 structured to execute the instructions of FIGS. 5 and 6 to implement the proxy service registrars 106 and/or, more generally, the VMs 102, 104, 118 of FIGS. 1 and 2. The processor platform 700 can be, for example, a server, a personal computer, a workstation, or any other type of computing device.

The processor platform 700 of the illustrated example includes a processor 710. The processor 710 of the illustrated example is hardware. For example, the processor 710 can be implemented by one or more integrated circuits, logic circuits, microprocessors, GPUs, DSPs, or controllers from any desired family or manufacturer. The hardware processor 710 may be a semiconductor based (e.g., silicon based) device. In this example, the processor implements the proxy service registrar 106, 200 the interfaces 112, 114, the system service registrar 116, the application(s) 120, the registrater 208, the discoverer 212 and syncer 220.

The processor 710 of the illustrated example includes a local memory 712 (e.g., a cache). The processor 710 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 710. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, and/or a network interface to facilitate exchange of data with external machines (e.g., computing devices of any kind) via a network 726. The communication can be via, for example, an Ethernet connection, a backplane, a processor interconnect, etc.

The processor platform 700 of the illustrated example also includes one or more mass storage devices 728 for storing software and/or data. Examples of such mass storage devices 728 include floppy disk drives, hard drive disks, CD drives, Blu-ray disk drives, redundant array of independent disks (RAID) systems, and DVD drives.

Coded instructions 732 including the coded instructions of FIGS. 5 and/or 6 may be stored in the mass storage device 728, in the volatile memory 714, in the non-volatile memory 716, and/or on a removable non-transitory computer-readable storage medium such as a CD-ROM or a DVD. In this example, the non-volatile memory 716 and/or the mass storage device 728 implements the service registries 108, 110, 122, and 214.

From the foregoing, it will be appreciated that example methods, apparatus and articles of manufacture have been disclosed that ensure that a VMs having updateable services can boot and operate as intended after updating. From the foregoing, it will be appreciated that methods, apparatus and articles of manufacture have been disclosed that enhance the operations of a virtual machine by improving the reliability and updating of services that consistently result in VMs operating as intended. In some examples, computer operations can be made more efficient based on the above techniques by avoiding lengthy reversion and recovery efforts associated with known services management techniques. That is, through the use of these processes, computers can operate more efficiently and correctly by synchronizing services while preserving the ability to revert VM updates. Furthermore, example methods, apparatus, and/or articles of manufacture disclosed herein identify and overcome inability in the prior art to perform update VMs.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMware ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMware ESX® hypervisor, Microsoft Hyper-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein may be implemented in any one or more of the multiple different virtualization environments.

Example methods, apparatus, and articles of manufacture to manage services data in distributed systems are disclosed herein. Further examples and combinations thereof include at least the following.

Example 1 is a distributed system that includes a first virtual machine including a first storage device to store a first service registry for a plurality of virtual machines; and a second virtual machine, of the plurality of virtual machines, including:
a second storage device to store a second service registry for the second virtual machine; and
a proxy service registrar having an interface to selectively provide a first service from the first service registry or the second service registry responsive to a query of the second virtual machine for the first service.

Example 2 is the distributed system of example 1, wherein the proxy service registrar includes a discoverer to:
provide an identifier related to the first service from the second service registry when the proxy service registrar identifies the first service in the second service registry; and
provide an identifier related to the first service from the first service registry when the proxy service registrar does not identify the first service in the second service registry.

Example 3 is the distributed system of example 1, wherein the proxy service registrar includes:
a registrater to store a second service in the second service registry during an update of the second virtual machine; and
a syncer to synchronize the second service with the first service registry when the second virtual machine operates as intended.

Example 4 is a computer-implemented method that includes:
storing, by executing an instruction with one or more processors, a first service in a local service registry while at least one of an update of a first virtual machine is performed; and
synchronizing, by executing an instruction with the one or more processors, the first service stored in the local service registry with a system service registry when the first virtual machine operates as intended following the update.

Example 5 is the method of example 4, further including determining whether the first virtual machine operates as intended.

Example 6 is the method of example 4, further including: providing, by executing an instruction with the one or more processors, a second service from the local service registry when the second service is identified in the local service registry; and
providing, by executing an instruction with the one or more processors, the second service from the system service registry when the second service is not identified in the local service registry.

Example 7 is the method of example 4, wherein synchronizing the first service with the system service registry renders the first service accessible to a second virtual machine.

Example 8 is the method of example 4, further including restoring, by executing an instruction with the one or more processors, a state of the first virtual machine using a snapshot when the first virtual machine does not operate as intended after the update.

Example 9 is the method of example 4, further including synchronizing the local service registry with the system service registry when a connection with the system service registry is reestablished.

Example 10 is the method of example 4, including synchronizing the local service registry with the system service registry when a poll indicates the local service registry and the system service registry are out of sync.

Example 11 is a proxy service registrar including
a registrater to store a first service in a local service registry while at least one of an update of a first virtual machine is performed; and
a syncer to synchronize the first service stored in the local service registry with a system service registry when the first virtual machine operates as intended following the update.

Example 12 is the proxy service registrar of example 11, further including a storage device to store the local service registry, the system service registry stored on a second virtual machine.

Example 13 is the proxy service registrar of example 11, further including a discoverer to:
provide a second service from the local service registry when the second service is identified in the local service registry; and
provide the second service from the system service registry when the second service is not identified in the local service registry.

Example 14 is the proxy service registrar of example 11, wherein synchronizing the first service with the system service registry renders the first service accessible to a second virtual machine.

Example 15 is the proxy service registrar of example 11, wherein the syncer synchronizes with the system service registry when a connection between the syncer and the system service registry reestablished.

Example 16 is a non-transitory computer-readable storage medium comprising instructions that, when executed by one or more processors, cause the one or more processors to at least:
store a first service in a local service registry while at least one of an update of a first virtual machine is performed; and
synchronize the first service stored in the local service registry with a system service registry when the first virtual machine operates as intended after the update.

Example 17 is the non-transitory computer-readable storage medium of example 16, wherein the instructions, when executed, cause the one or more processors to determine whether the first virtual machine operates as intended.

Example 18 is the non-transitory computer-readable storage medium of example 16, wherein the instructions, when executed, cause the one or more processors to:
provide a second service from the local service registry when the second service is identified in the local service registry; and
provide the second service from the system service registry when the second service is not identified in the local service registry.

Example 19 is the non-transitory computer-readable storage medium of example 16, wherein the instructions, when executed, cause the one or more processors to synchronize the first service with the system service registry to render the first service accessible to a second virtual machine.

Example 20 is the non-transitory computer-readable storage medium of example 16, wherein the instructions, when executed, cause the one or more processors to restore a state of the first virtual machine using a snapshot when the first virtual machine does not operate as intended after the update.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A distributed system, comprising:
a first virtual machine to store a first service registry for a plurality of virtual machines; and
a second virtual machine of the plurality of virtual machines, the second virtual machine to:
store a second service registry for the second virtual machine, the second virtual machine including a proxy service registrar, the proxy service registrar to:
store a first service in the second service registry while an update of the second virtual machine is performed;
restore a state of the second virtual machine using a snapshot in response to an unsuccessful update of the second virtual machine;
synchronize the first service stored in the second service registry with the first service registry in response to a successful update of the second virtual machine;
provide the first service from the first service registry in response to the second virtual machine providing a response to a query for the first service indicative that the first service is not identified in the second service registry;
provide a second service from the second service registry in response to determining that the second service is identified in the second service registry; and
provide the second service from the first service registry in response to determining that the second service is not identified in the second service registry.

2. The distributed system of claim 1, wherein the proxy service registrar includes a discoverer to:
provide an identifier related to the first service from the second service registry in response to determining that the first service is identified in the second service registry; and provide the identifier related to the first service from the first service registry in response to determining that the first service is not identified in the second service registry.

3. The distributed system of claim 1, wherein the proxy service registrar includes:
a registrater to store the second service in the second service registry during the update of the second virtual machine; and
a syncer to synchronize the second service with the first service registry in response to the successful update of the second virtual machine.

4. A computer-implemented method, comprising:
storing, by executing an instruction with one or more processors, a first service in a local service registry while an update of a first virtual machine is performed;
restoring a state of the first virtual machine using a snapshot in response to an unsuccessful update of the first virtual machine;
synchronizing, by executing an instruction with the one or more processors, the first service stored in the local service registry with a system service registry in response to a successful update of the first virtual machine;
providing, by executing an instruction with the one or more processors, the first service from the local service registry in response to a second virtual machine providing a response to a query for the first service indicative that the first service is not located in the system service registry;
providing, by executing an instruction with the one or more processors, a second service from the local service registry in response to determining that the second service is identified in the local service registry; and
providing, by executing an instruction with the one or more processors, the second service from the system service registry in response to determining that the second service is not identified in the local service registry.

5. The method of claim 4, further including determining whether the first virtual machine updates successfully.

6. The method of claim 4, wherein the synchronizing of the first service with the system service registry renders the first service accessible to the second virtual machine.

7. The method of claim 4, wherein the synchronizing of the local service registry with the system service registry is in response to a reestablishment of a connection with the system service registry.

8. The method of claim 4, wherein the synchronizing of the local service registry with the system service registry is in response to a poll identifying that the local service registry and the system service registry are out of sync.

9. A proxy service registrar, comprising:
a registrater to store a first service in a local service registry while an update of a first virtual machine is performed;
a syncer to:
restore a state of the first virtual machine using a snapshot in response to an unsuccessful update of the first virtual machine; and
synchronize the first service stored in the local service registry with a system service registry in response to a successful update of the first virtual machine; and
a discoverer to:
provide the first service from the local service registry in response to a second virtual machine providing a response to a query for the first service indicative that the first service is not located in the system service registry;
provide a second service from the local service registry in response to determining that the second service is identified in the local service registry; and
provide the second service from the system service registry in response to determining that the second service is not identified in the local service registry.

10. The proxy service registrar of claim 9, wherein the system service registry is stored on the second virtual machine.

11. The proxy service registrar of claim 9, wherein the syncer is to synchronize the first service with the system service registry to render the first service accessible to the second virtual machine.

12. The proxy service registrar of claim 9, wherein the syncer is to synchronize with the system service registry in response to a reestablishment of a connection between the syncer and the system service registry.

13. A non-transitory computer-readable storage medium comprising instructions that, when executed by one or more processors, cause the one or more processors to at least:
store a first service in a local service registry while an update of a first virtual machine is performed;
restore a state of the first virtual machine using a snapshot in response to an unsuccessful update of the first virtual machine;
synchronize the first service stored in the local service registry with a system service registry in response to a successful update of the first virtual machine;
provide the first service from the local service registry in response to a second virtual machine providing a response to a query for the first service indicative that the first service is not located in the system service registry;
provide a second service from the local service registry in response to a determination that the second service is identified in the local service registry; and
provide the second service from the system service registry in response to a determination that the second service is not identified in the local service registry.

14. The non-transitory computer-readable storage medium of claim 13, wherein the instructions, when executed, cause the one or more processors to determine whether the first virtual machine updated successfully.

15. The non-transitory computer-readable storage medium of claim 13, wherein the instructions, when executed, cause the one or more processors to synchronize the first service with the system service registry to render the first service accessible to the second virtual machine.

* * * * *